US012027018B2

(12) United States Patent
Guerrero

(10) Patent No.: US 12,027,018 B2
(45) Date of Patent: Jul. 2, 2024

(54) GAMING SYSTEM AND METHOD WITH SYMBOL CATALYST FEATURE

(71) Applicant: LNW Gaming, Inc., Las Vegas, NV (US)

(72) Inventor: Christopher Guerrero, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 237 days.

(21) Appl. No.: 17/747,145

(22) Filed: May 18, 2022

(65) Prior Publication Data

US 2023/0377419 A1 Nov. 23, 2023

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3244* (2013.01); *G07F 17/34* (2013.01)

(58) Field of Classification Search
None
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
5,395,111 A 3/1995 Inoue
5,431,408 A 7/1995 Adams
(Continued)

FOREIGN PATENT DOCUMENTS

AU 2001055957 A1 3/2002
AU 2013251288 A1 5/2014
(Continued)

OTHER PUBLICATIONS

YouTube, "Ancient Arcadia slot machine, with Scatter Bucks", https://www.youtube.com/watch?v=tZRmLGTqJr0, RandomSlots, Feb. 12, 2018 (Year: 2018).*
(Continued)

*Primary Examiner* — Damon J Pierce

(57) ABSTRACT

There is provided a gaming system, gaming machine, and method that utilize a presentation assembly configured to present a plurality of reels, an array, and an indicator. The plurality of reels bear a plurality of symbols. Game-logic circuitry is configured to spin and stop the plurality of reels to land symbols from the plurality of symbols in the array. In response to the landed symbols including one or more catalyst symbols and one or more value-bearing symbols, a multiplier is determined based on a number and locations of the catalyst symbols in the array. The multiplier is displayed in the indicator. An award is provided based on the multiplier applied to values borne by the value-bearing symbols.

20 Claims, 4 Drawing Sheets

(56) References Cited

U.S. PATENT DOCUMENTS

| | | | |
|---|---|---|---|
| 5,511,781 | A | 4/1996 | Wood et al. |
| 5,618,232 | A | 4/1997 | Martin |
| 5,695,188 | A | 12/1997 | Ishibashi |
| 5,704,835 | A | 1/1998 | Dietz |
| 5,722,891 | A | 3/1998 | Inoue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,869,360 | B2 | 3/2005 | Marks et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,926,609 | B2 | 8/2005 | Martin |
| 6,960,134 | B2 | 11/2005 | Hartl et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,121,945 | B2 | 10/2006 | Suganuma et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |

(56) References Cited

U.S. PATENT DOCUMENTS

| | | | |
|---|---|---|---|
| 8,882,578 B2 | 11/2014 | Saunders | |
| 8,961,291 B2 | 2/2015 | Dias Pires et al. | |
| 9,005,022 B2 | 4/2015 | Saunders | |
| 9,011,233 B2 | 4/2015 | Ryan | |
| 9,098,847 B2 | 8/2015 | Basallo et al. | |
| 9,098,973 B2 | 8/2015 | Basallo et al. | |
| 9,147,321 B2 | 9/2015 | Moody | |
| 9,165,433 B2 | 10/2015 | Caputo | |
| 9,177,447 B2 | 11/2015 | Zoltewicz et al. | |
| 9,202,345 B2 | 12/2015 | Zoltewicz et al. | |
| 9,214,011 B2 | 12/2015 | Wei et al. | |
| 9,230,410 B2 | 1/2016 | Saunders et al. | |
| 9,245,421 B2 | 1/2016 | Saunders et al. | |
| 9,251,667 B2 | 2/2016 | Marks et al. | |
| 9,257,017 B2 | 2/2016 | Saunders et al. | |
| 9,262,895 B2 | 2/2016 | Rodgers et al. | |
| 9,275,524 B2 | 3/2016 | Nicely | |
| 9,299,224 B2 | 3/2016 | Leupp | |
| 9,311,781 B2 | 4/2016 | Edwards | |
| 9,349,251 B2 | 5/2016 | Caputo et al. | |
| 9,355,528 B2 | 5/2016 | Nicely | |
| 9,418,521 B1 | 8/2016 | Henrick et al. | |
| 9,424,720 B2 | 8/2016 | Suda | |
| 9,430,900 B2 | 8/2016 | Zoltewicz et al. | |
| 9,466,169 B2 | 10/2016 | Basallo et al. | |
| 9,474,972 B2 | 10/2016 | Lenger | |
| 9,495,839 B2 | 11/2016 | Aoki et al. | |
| 9,595,157 B2 | 3/2017 | Rasmussen et al. | |
| 9,633,506 B2 | 4/2017 | Basallo et al. | |
| 9,704,342 B2 | 7/2017 | Aoki et al. | |
| 9,928,691 B2 | 3/2018 | Olive | |
| 10,013,855 B2 | 7/2018 | Nakamura | |
| 10,037,651 B2 | 7/2018 | You et al. | |
| 10,043,350 B2 | 8/2018 | Gomez et al. | |
| 10,062,237 B2 | 8/2018 | Devine et al. | |
| 10,204,473 B2 | 2/2019 | Lenger | |
| 10,242,533 B2 | 3/2019 | Okada et al. | |
| 10,339,761 B2 | 7/2019 | Olive | |
| 10,366,575 B2 | 7/2019 | Msser | |
| 10,388,112 B2 | 8/2019 | You et al. | |
| 10,410,472 B2 | 9/2019 | Moody | |
| 10,417,877 B2 | 9/2019 | Gomez et al. | |
| 10,475,294 B2 | 11/2019 | Gomez et al. | |
| 10,497,203 B2 | 12/2019 | Elmqvist | |
| 10,672,220 B2 | 6/2020 | Lenger | |
| 10,706,664 B2 | 7/2020 | Boese et al. | |
| 10,726,676 B2 | 7/2020 | You et al. | |
| 10,769,888 B2 | 9/2020 | You et al. | |
| 10,839,648 B2 | 11/2020 | Okada et al. | |
| 10,957,161 B2 | 3/2021 | Chesworth et al. | |
| 11,017,638 B2 | 5/2021 | Chesworth et al. | |
| 2001/0021666 A1 | 9/2001 | Yoshida et al. | |
| 2002/0016200 A1 | 2/2002 | Baerlocher et al. | |
| 2002/0045474 A1 | 4/2002 | Singer et al. | |
| 2002/0119818 A1 | 8/2002 | Savio et al. | |
| 2002/0155881 A1 | 10/2002 | Yoshida | |
| 2002/0183105 A1 | 12/2002 | Cannon et al. | |
| 2003/0017865 A1 | 1/2003 | Beaulieu et al. | |
| 2003/0027619 A1 | 2/2003 | Nicastro, Sr. | |
| 2003/0035346 A1 | 2/2003 | Laughlin | |
| 2003/0064782 A1 | 4/2003 | Beaulieu et al. | |
| 2003/0064801 A1 | 4/2003 | Breckner et al. | |
| 2003/0064802 A1 | 4/2003 | Rodgers et al. | |
| 2003/0069063 A1 | 4/2003 | Bilyeu et al. | |
| 2003/0130034 A1 | 7/2003 | Suganuma et al. | |
| 2003/0157980 A1 | 8/2003 | Loose et al. | |
| 2003/0216165 A1 | 11/2003 | Singer et al. | |
| 2004/0012145 A1 | 1/2004 | Inoue | |
| 2004/0023714 A1 | 2/2004 | Asdale | |
| 2004/0043815 A1 | 3/2004 | Kaminkow | |
| 2004/0048646 A1 | 3/2004 | Msocnik | |
| 2004/0092315 A1 | 5/2004 | Boyd et al. | |
| 2004/0137982 A1 | 7/2004 | Cuddy et al. | |
| 2004/0171417 A1 | 9/2004 | Beaulieu et al. | |
| 2004/0198489 A1 | 10/2004 | Kaminkow et al. | |
| 2005/0054442 A1 | 3/2005 | Anderson et al. | |
| 2005/0130731 A1 | 6/2005 | Englman et al. | |
| 2005/0159208 A1 | 7/2005 | Pacey | |
| 2006/0009286 A1 | 1/2006 | Durham et al. | |
| 2006/0063588 A1 | 3/2006 | Poole | |
| 2006/0111173 A1 | 5/2006 | Yang | |
| 2006/0142080 A1 | 6/2006 | Enzminger | |
| 2006/0189369 A1 | 8/2006 | Taylor | |
| 2006/0205469 A1 | 9/2006 | Schultz et al. | |
| 2006/0247002 A1 | 11/2006 | Yoshimi et al. | |
| 2007/0060248 A1 | 3/2007 | Rodgers et al. | |
| 2007/0060255 A1 | 3/2007 | Baerlocher et al. | |
| 2007/0060275 A1 | 3/2007 | Gilmore et al. | |
| 2007/0129135 A1 | 6/2007 | Marks et al. | |
| 2007/0149267 A1 | 6/2007 | Ross et al. | |
| 2007/0281784 A1 | 12/2007 | Seelig et al. | |
| 2007/0287529 A1 | 12/2007 | Kojima | |
| 2008/0003278 A1 | 1/2008 | Mondelo | |
| 2008/0004532 A1 | 1/2008 | Rubey et al. | |
| 2008/0032784 A1 | 2/2008 | Englman | |
| 2008/0045298 A1 | 2/2008 | Yoshizawa | |
| 2008/0045320 A1 | 2/2008 | Kato | |
| 2008/0108408 A1 | 5/2008 | Wolf | |
| 2008/0108411 A1 | 5/2008 | Jensen et al. | |
| 2008/0108422 A1 | 5/2008 | Hedrick et al. | |
| 2008/0108431 A1 | 5/2008 | Cuddy et al. | |
| 2008/0132321 A1 | 6/2008 | Pau | |
| 2008/0182647 A1 | 7/2008 | Brunet De Courssou et al. | |
| 2008/0274789 A1 | 11/2008 | Singer et al. | |
| 2009/0036208 A1 | 2/2009 | Pennington et al. | |
| 2009/0156287 A1 | 6/2009 | Baumgartner | |
| 2009/0181755 A1 | 7/2009 | Gagner et al. | |
| 2009/0239634 A1 | 9/2009 | Nguyen | |
| 2009/0291741 A1 | 11/2009 | Schofield | |
| 2010/0075737 A1 | 3/2010 | Bluemel | |
| 2010/0113133 A1 | 5/2010 | Leupp | |
| 2010/0167815 A1 | 7/2010 | Gagner et al. | |
| 2010/0203948 A1 | 8/2010 | Falciglia, Sr. | |
| 2010/0210343 A1 | 8/2010 | Englman et al. | |
| 2010/0234092 A1 | 9/2010 | Gomez et al. | |
| 2010/0304832 A1 | 12/2010 | Kup-Ferroth | |
| 2011/0244943 A1 | 10/2011 | Milford et al. | |
| 2011/0300937 A1 | 12/2011 | Crowder, Jr. et al. | |
| 2012/0015707 A1 | 1/2012 | Hornik et al. | |
| 2012/0034965 A1 | 2/2012 | Masen et al. | |
| 2012/0077564 A1 | 3/2012 | Collette et al. | |
| 2012/0094738 A1 | 4/2012 | Aoki et al. | |
| 2012/0122532 A1 | 5/2012 | Berman et al. | |
| 2012/0178517 A1 | 7/2012 | Montenegro et al. | |
| 2012/0220360 A1 | 8/2012 | Kelly et al. | |
| 2013/0053124 A1 | 2/2013 | Masen et al. | |
| 2013/0065663 A1 | 3/2013 | Johnson et al. | |
| 2013/0102375 A1 | 4/2013 | Aoki et al. | |
| 2013/0252704 A1 | 9/2013 | Gilbertson et al. | |
| 2013/0260861 A1 | 10/2013 | Vann et al. | |
| 2013/0324217 A1 | 12/2013 | Gilbertson et al. | |
| 2014/0014186 A1 | 1/2014 | Bhattacharya et al. | |
| 2014/0024429 A1 | 1/2014 | Aoki et al. | |
| 2014/0051496 A1 | 2/2014 | Meyer | |
| 2014/0141860 A1 | 5/2014 | Meyer | |
| 2014/0179396 A1 | 6/2014 | Aoki et al. | |
| 2014/0274292 A1 | 9/2014 | Suda | |
| 2014/0323198 A1 | 10/2014 | Tuck | |
| 2015/0031437 A1 | 1/2015 | Gomez et al. | |
| 2015/0170462 A1 | 6/2015 | Berman et al. | |
| 2015/0206386 A1 | 7/2015 | Jaffe et al. | |
| 2015/0269809 A1 | 9/2015 | Smith | |
| 2015/0287269 A1 | 10/2015 | Berman | |
| 2015/0356833 A1 | 12/2015 | Aoki et al. | |
| 2015/0379831 A1 | 12/2015 | Lee et al. | |
| 2016/0042597 A1 | 2/2016 | Olive | |
| 2016/0155303 A1 | 6/2016 | Aoki et al. | |
| 2017/0024974 A1* | 1/2017 | Berman | G07F 17/3213 |
| 2017/0154498 A1 | 6/2017 | Olive | |
| 2017/0372558 A1 | 12/2017 | You et al. | |
| 2018/0130303 A1 | 5/2018 | Amb | |
| 2018/0268655 A1 | 9/2018 | Olive | |

(56) References Cited

U.S. PATENT DOCUMENTS

| | | | |
|---|---|---|---|
| 2018/0268659 | A1 | 9/2018 | Chesworth et al. |
| 2019/0102992 | A1 | 4/2019 | You et al. |
| 2019/0236905 | A1 | 8/2019 | Washington et al. |

FOREIGN PATENT DOCUMENTS

| | | | |
|---|---|---|---|
| AU | 2014202042 | A1 | 5/2014 |
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

OTHER PUBLICATIONS

Ancient Arcadia game brochure, Copyright 2011 IGT.
Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Product Sheet for "Vikings Creed," Released Oct. 2020, Slotmill Limited.
"Jack and the Beanstalk" Game Sheet, Copyright 2017 NetEnt Product Services Ltd.

* cited by examiner

GAMING SYSTEM AND METHOD WITH SYMBOL CATALYST FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations in connection with a feature in which catalyst symbols trigger and modify an award associated with value-bearing symbols in a symbol array.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize a presentation assembly configured to present a plurality of reels, an array, and an indicator. The plurality of reels bear a plurality of symbols. Game-logic circuitry is configured to spin and stop the plurality of reels to land symbols from the plurality of symbols in the array. In response to the landed symbols including one or more catalyst symbols and one or more value-bearing symbols, a multiplier is determined based on a number and locations of the catalyst symbols in the array. The multiplier is displayed in the indicator. An award is provided based on the multiplier applied to values borne by the value-bearing symbols. Additional aspects of the invention will be apparent to those of ordinary skill in the art in view of the detailed description of various embodiments, which is made with reference to the drawings, a brief description of which is provided below.

Figure 1:
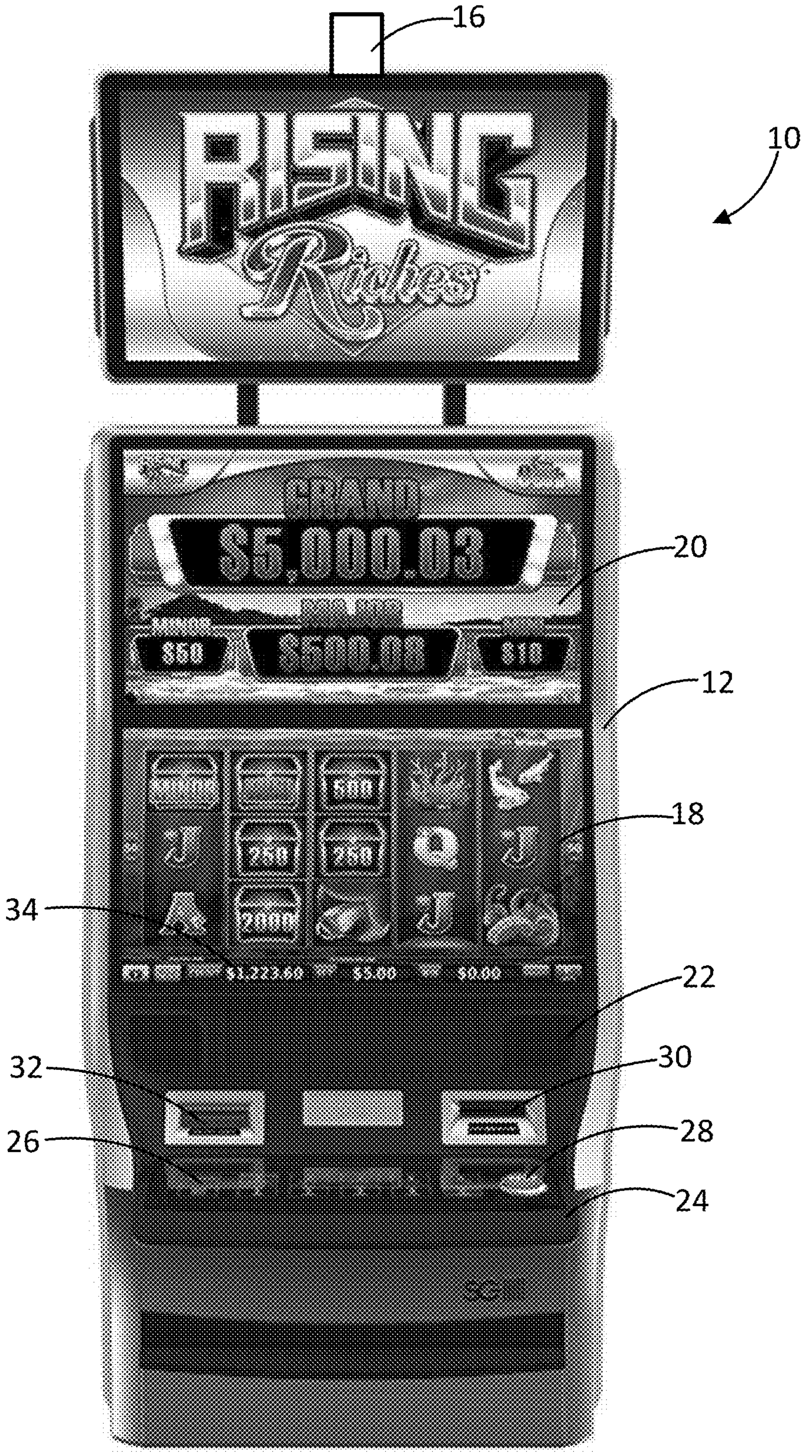
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) mounted over the primary or secondary presentation devices, an input deck 24 supporting a video button panel 26 bearing touch keys and one or more mechanical push-buttons 28, a bill/ticket acceptor 30, a card reader/writer (not shown), a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, video button panel 26, push-buttons 28, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credit" meter 34. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 30, a card reader/writer (not shown), a wireless communication interface for reading cash or credit data from a nearby mobile device, and a network interface for withdrawing cash or credits from a remote account via an electronic funds transfer. In response to a cashout input that initiates a payout from the credit balance on the "credit" meter 34, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, a card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
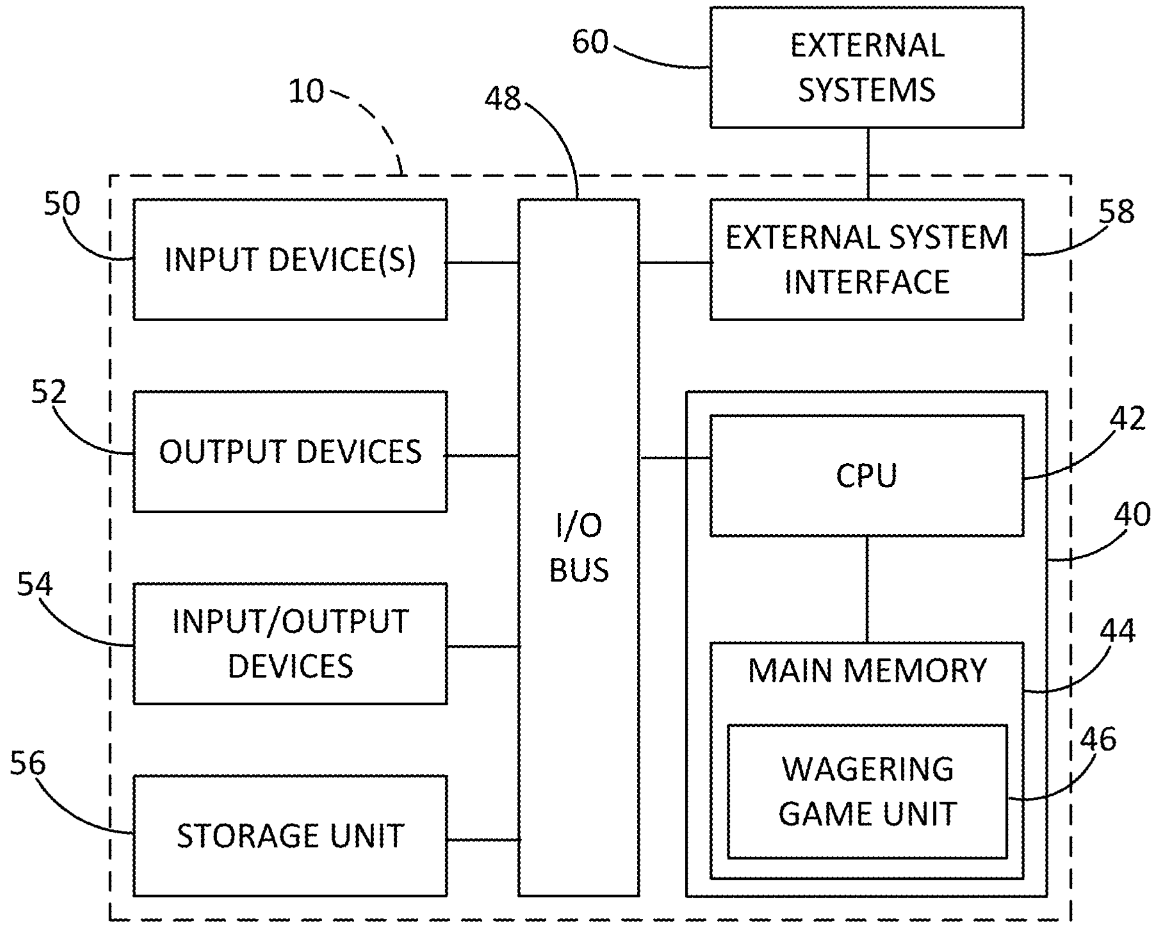
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
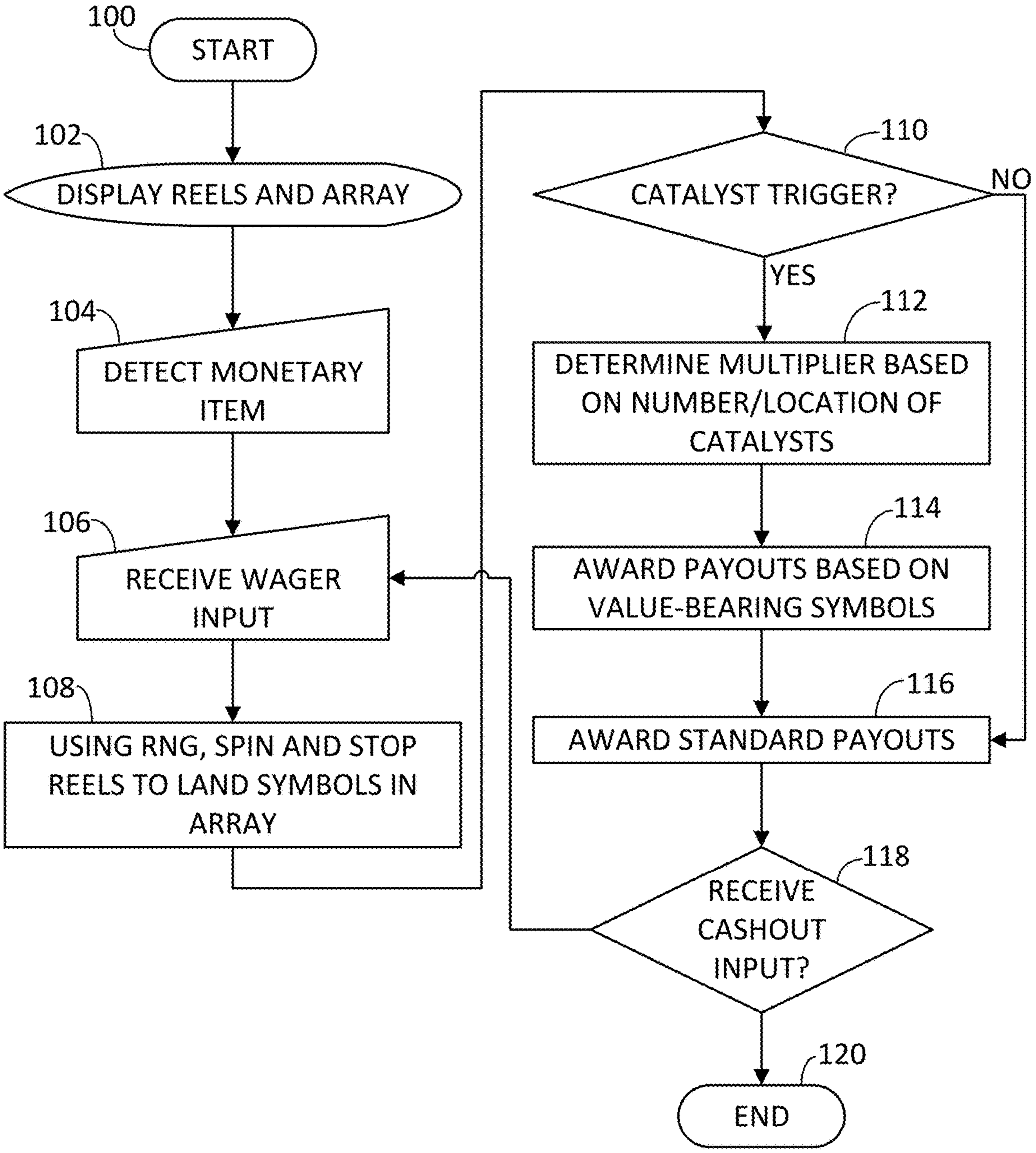
FIG. 3 is a flow diagram for a data processing method that corresponds to instructions executed by a controller, according to an embodiment of the present invention.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of spin outcomes in FIGS. 4-7.

The data processing method commences at step 100. At step 102, the game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position.

Figure 4:
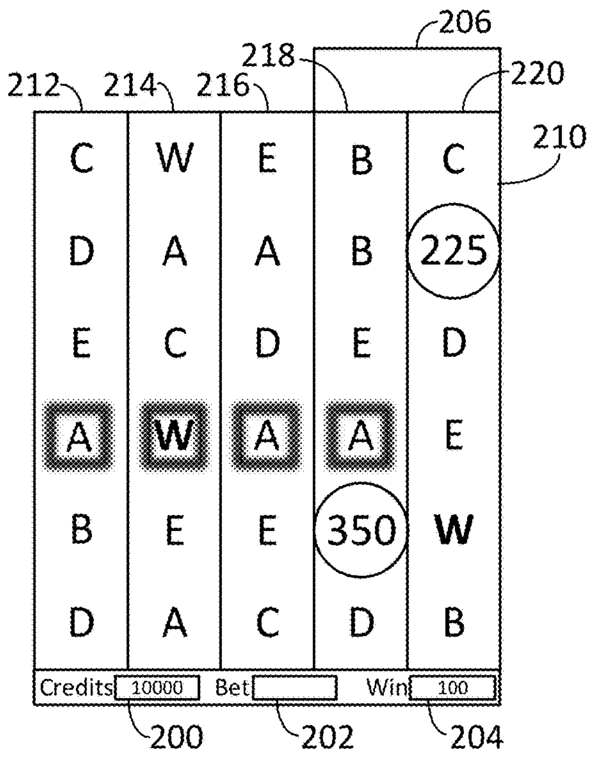
FIGS. 4-7 illustrate examples of displayed spin outcomes resulting from the flow diagram in FIG. 3.
Figure 5:
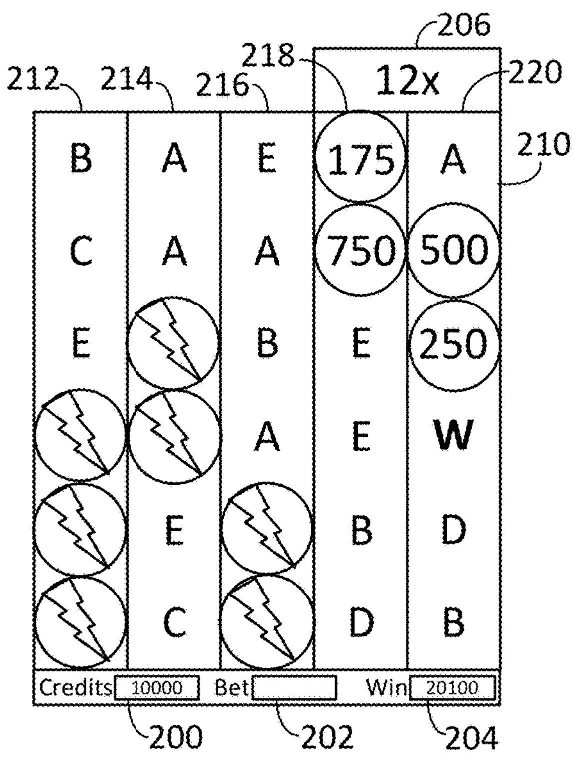

In the examples shown in FIGS. 4-5, the presentation device presents a six-by-five array 210 comprising six rows and five columns 210, 212, 214, 216, 218. In the example shown in FIG. 6, the presentation devices present a four-by-five array 210 comprising four rows and five columns. In the example shown in FIG. 7, the presentation device presents a three-by-five array 210 comprising three rows and five columns. The number of rows and/or columns may vary from spin to spin of a base game and/or free-spin bonus game triggered during play of the base game. For example, the array may be a first size (e.g., three-by-five) during the base game and a second size (e.g., six-by-five) during the bonus game. The size of the array may be selected by the player or randomly selected by the game-logic circuitry.

The reels bear a plurality of symbols. In one embodiment, the plurality of symbols include standard symbols A, B, C, D, and E; a wild symbol W that can substitute for any of the standard symbols; value-bearing symbols that bear numerical credit or currency amounts (e.g., a number in the range of 100 to 1000 credits); and a catalyst symbol bearing, e.g., indicia of lightning. Each value-bearing symbol is associated with a credit or currency value indicated on the symbol itself. The value on a particular value-bearing symbol may be fixed or variable (e.g., random) from one spin cycle to the next. Different value-bearing symbols on the reels may have different values. Each reel may contain one or more stacks (i.e., clumps) of value-bearing symbols that appear adjacent to each other along the reel. The values of the value-bearing symbols in any given stack may be the same or different. A stack of value-bearing symbols may consist of two, three, four, or more adjacent value-bearing symbols. The value-bearing symbols may appear on all the reels or on only a subset of less than all the reels, e.g., the reels that populate columns 218 and 220. Similarly, the catalyst symbol may appear on all the reels or on only a subset of less than all the reels, e.g., the reels that populate columns 212, 214, and 216.

At step 104, the game-logic circuitry detects, via a value input device, a physical item associated with a monetary value that establishes a credit balance. As shown in FIGS. 4-7, the credit balance may be shown on a credit meter 200 of the gaming machine.

At step 106, the game-logic circuitry initiates a wagering game cycle (i.e., spin cycle) in response to an input indicative of a wager covered by the credit balance. To initiate a spin of the reels, the player may press a "Spin" or "Max Bet" key on a button panel or touch screen. As shown in FIGS. 4-7, the wager may be shown on a bet meter 202.

At step 108, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Each of FIGS. 4-7 depicts a respective outcome of a reel spin.

Figure 6:
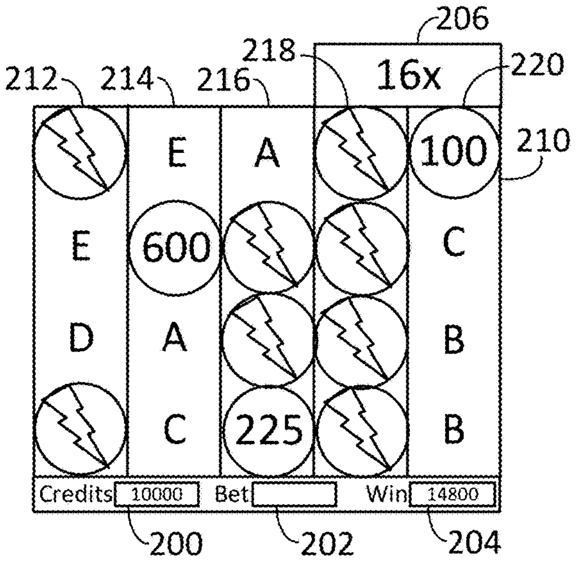
Figure 7:
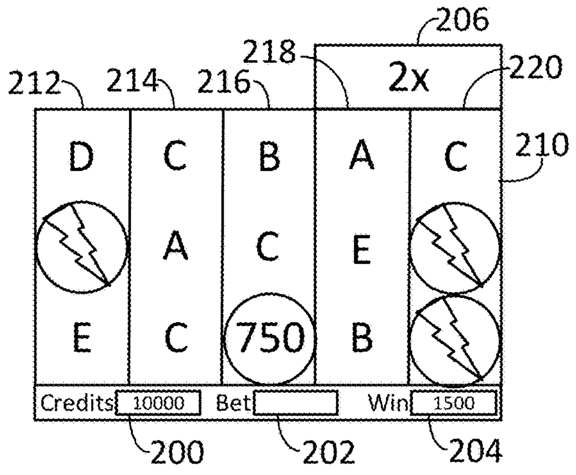

At step 110, the game-logic circuitry determines whether or not one or more catalyst symbols (e.g., a lightning symbol) landed in the array. If a catalyst symbol did not land in the array, the game-logic circuitry immediately proceeds to step 116. If, however, one or more catalyst symbols landed in the array, the game-logic circuitry first proceeds to steps 112 and 114. At step 112, the game-logic circuitry determines a multiplier based the number and/or locations of catalyst symbols. In one embodiment, the multiplier is equal to the product of the numbers of catalyst symbols in each column. For example, in FIG. 5, there are three catalyst symbols in column 212, two catalyst symbols in column 214, and two catalyst symbols in column 216, such that the multiplier is 3×2×2=12. In FIG. 6, there are two catalyst symbols in column 212, two catalyst symbols in column 216, and four catalyst symbols in column 218, such that the multiplier is 2×2×4=16. In FIG. 7, there is one catalyst symbol in column 212 and two catalyst symbols in column 220, such that the multiplier is 1×2=2. The multiplier is shown in an information box or indicator 206. In another embodiment, the multiplier is equal to the sum of the numbers of catalyst symbols in each column, in which case the multipliers in FIGS. 5, 6, and 7 would be 7×, 8×, and 3×, respectively.

At step 114, the game-logic circuitry awards payouts based on any value-bearing symbols in the array. The payout for each value-bearing symbol is equal to the product of the multiplier in indicator 206 and the value of the value-bearing symbol. For example, in FIG. 5, the payouts for the four symbols bearing credit values of 175, 750, 500, and 250 are (175×12)+(750×12)+(500×12)+(250×12)=20100 credits. In FIG. 6, the payouts for the three symbols bearing credits values of 600, 225, and 100 are (600×16)+(225×16)+(100×16)=14800 credits. In FIG. 7, the payout for the symbol bearing a credit value of 750 is (750×2)=1500 credits. To animate the payouts, the display may apply a border, pattern, color change, background change, watermark, or other distinguishing characteristic to the value-bearing symbols and depict the application of the multiplier in indicator 206 to each value-bearing symbol. The awarded pays are added to a win meter 204. The game-logic circuitry then proceeds to step 116.

At step 116, the game-logic circuitry awards standard payouts in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. In the examples shown in FIGS. 4-7, standard pays are limited to line pays along horizontal paylines starting from the leftmost reel such that each line spans a respective row of the array 230. FIG. 4, for example, depicts a line pay of four A symbols in which a wild symbol W substitutes for an A symbol in second column 214. The awarded pays are added to the win meter 204.

At step 118, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the credit balance on the credit meter such as the meter 200 in FIGS. 4-7. The data processing method then ends at step 120.

The illustrated method discloses steps 110, 112, and 114 in the context of a base game for which a wager is placed on each spin of the reels. In an alternative embodiment, these steps may instead or additionally be performed in a bonus game triggered during play of a base game. The bonus game may include one or more free spins of the reels. The number of free spins may be a fixed or variable number. In each free spin, the game-logic circuitry spins and stops the reels to randomly land symbols in the array and performs steps 110, 112, and 114. The bonus game may be a "hold-and-respin" game in which the value-bearing symbols are held or locked in place in the array from one free spin to the next. The hold-and-respin game may commence with an initial number of free spins such as three. The appearance of any additional value-bearing symbols during a free spin may reset the remaining number of free spins to the initial number.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

presenting, by a presentation assembly, a plurality of reels, an array, and an indicator, the plurality of reels bearing a plurality of symbols, the plurality of symbols including catalyst symbols and value-bearing symbols, the indicator being external to the array; and conducting, by game-logic circuitry, a spin of the plurality of reels, the spin including:

spinning and stopping the plurality of reels to land symbols from the plurality of symbols in the array;

in response to the landed symbols including one or more of the catalyst symbols and one or more of the value-bearing symbols:

determining a multiplier based on a number and locations of the catalyst symbols in the array;

displaying the multiplier in the indicator but not on the catalyst symbols; and awarding an award based on the multiplier applied to values borne by the value-bearing symbols; and in response to the landed symbols including one or more of the value-bearing symbols but not including one or more of the catalyst symbols, not awarding an award based at least in part on values borne by the value-bearing symbols.

2. The method of claim 1, wherein the array includes a plurality of columns, and wherein multiplier is equal to a product of the numbers of catalyst symbols in the respective columns that contain the catalyst symbols.

3. The method of claim 1, wherein the array includes a plurality of columns, and wherein the multiplier is equal to a sum of the numbers of catalyst symbols in the respective columns.

4. The method of claim 1, wherein the values are credit or currency values.

5. The method of claim 1, wherein the array includes a plurality of columns, and wherein the catalyst symbols and the value-bearing symbols can only land in mutually exclusive ones of the columns.

6. The method of claim 1, further comprising:

detecting, via a value input device, a physical item associated with a monetary value that establishes a credit balance; and receiving, via at least one of one or more electronic input devices, a cashout input that initiates a payout from the credit balance.

7. The method of claim 1, further comprising receiving, via at least one of one or more electronic input devices, a wager input that initiates the spin.

8. The method of claim 1, wherein the gaming machine is regulatorily approved and primarily dedicated to playing a wagering game.

9. A gaming system comprising:

a gaming machine including a presentation assembly configured to present a plurality of reels, an array, and an indicator, the plurality of reels bearing a plurality of symbols, the plurality of symbols including catalyst symbols and value-bearing symbols, the indicator being external to the array; and game-logic circuitry configured to perform the operation of conducting a spin of the plurality of reels, the spin including:

spinning and stopping the plurality of reels to land symbols from the plurality of symbols in the array;

in response to the landed symbols including one or more of the catalyst symbols and one or more of the value-bearing symbols:

determining a multiplier based on a number and locations of the catalyst symbols in the array;

displaying the multiplier in the indicator but not on the catalyst symbols; and awarding an award based on the multiplier applied to values borne by the value-bearing symbols; and in response to the landed symbols including one or more of the value-bearing symbols but not including one or more of the catalyst symbols, not awarding an award based at least in part on values borne by the value-bearing symbols.

10. The gaming system of claim 9, wherein the array includes a plurality of columns, and wherein multiplier is equal to a product of the numbers of catalyst symbols in the respective columns that contain the catalyst symbols.

11. The gaming system of claim 9, wherein the array includes a plurality of columns, and wherein the multiplier is equal to a sum of the numbers of catalyst symbols in the respective columns.

12. The gaming system of claim 9, wherein the values are credit or currency values.

13. The gaming system of claim 9, wherein the array includes a plurality, of columns, and wherein the catalyst symbols and the value-bearing symbols can only land in mutually exclusive ones of the columns.

14. The gaming system of claim 9, wherein the game-logic circuitry is further configured to perform the operations of:

detecting, via a value input device, a physical item associated with a monetary value that establishes a credit balance; and receiving, via at least one of one or more electronic input devices, a cashout input that initiates a payout from the credit balance.

15. The gaming system of claim 9, wherein the game-logic circuitry is further configured to perform the operation of receiving, via at least one of one or more electronic input devices, a wager input that initiates the spin.

16. The gaming system of claim 9, wherein the gaming machine is regulatorily approved and primarily dedicated to playing a wagering game.

17. A regulatorily-approved gaming machine primarily dedicated to playing a wagering game, the machine comprising:

a presentation assembly configured to present a plurality of reels, an array, and an indicator, the plurality of reels bearing a plurality of symbols, the plurality of symbols including catalyst symbols and value-bearing symbols, the indicator being external to the array; and game-logic circuitry configured to perform the operation of conducting a spin of the plurality of reels, the spin including:

spinning and stopping the plurality of reels to land symbols from the plurality of symbols in the array;

in response to the landed symbols including one or more of the catalyst symbols and one or more of the value-bearing symbols:

determining a multiplier based on a number and locations of the catalyst symbols in the array;

displaying the multiplier in the indicator but not on the catalyst symbols; and awarding an award based on the multiplier applied to values borne by the value-bearing symbols; and in response to the landed s symbols including one or more of the value-bearing symbols but not including one or more of the catalyst symbols, not awarding an award based at least in part on values borne by the value-bearing symbols.

18. The gaming machine of claim 17, wherein the array includes a plurality of columns, and wherein multiplier is equal to a product of the numbers of catalyst symbols in the respective columns that contain the catalyst symbols.

19. The gaming machine of claim 17, wherein the array includes a plurality of columns, and wherein the multiplier is equal to a sum of the numbers of catalyst symbols in the respective columns.

20. The gaming machine of claim 17, wherein the values are credit or currency values.

* * * * *